Dec. 22, 1925.
C. E. CHILSON
1,566,827
UNIVERSAL PROTECTOR BAR
Filed Feb. 13, 1925
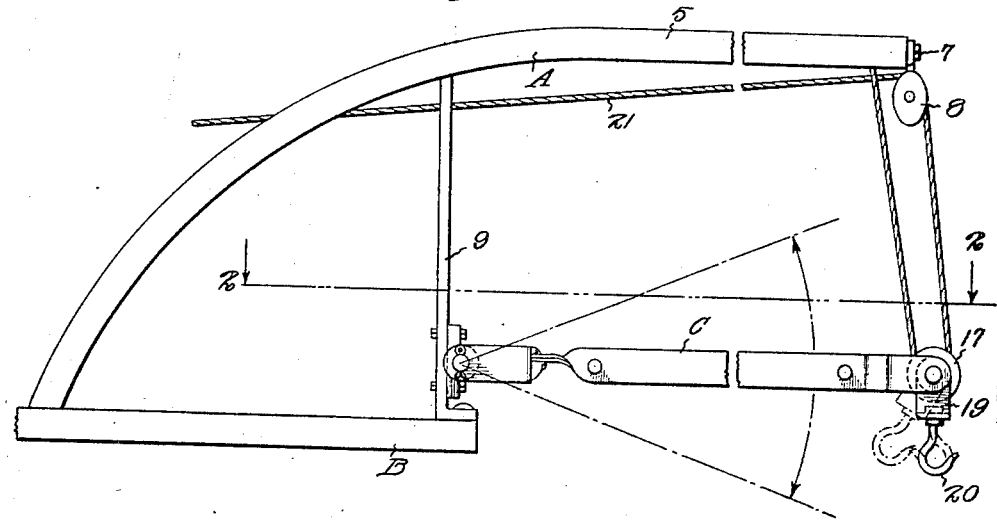
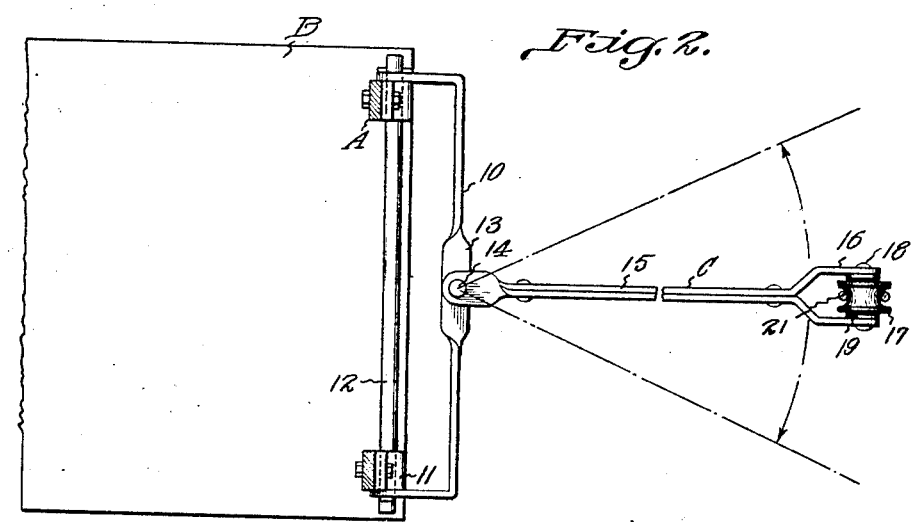
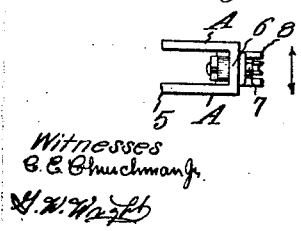
C. E. Chilson, Inventor Patented Dec. 22, 1925.

1,566,827

UNITED STATES PATENT OFFICE.

CLAUDE E. CHILSON, OF ELMIRA, NEW YORK.

UNIVERSAL PROTECTOR BAR.

Application filed February 13, 1925. Serial No. 8,997.

*To all whom it may concern:*

Be it known that I, CLAUDE E. CHILSON, a citizen of the United States, residing at Elmira, in the county of Chemung and State of New York, have invented certain new and useful Improvements in Universal Protector Bars, of which the following is a specification.

This invention appertains to motor vehicles and more particularly to a novel attachment for wrecking or repair cars to facilitate the hauling of a disabled automobile or the like.

The primary object of the invention is to provide a novel protecting bar for forming a part of the crane of a wrecking car, the bar being so constructed and associated with the crane and wrecking car in such a manner as to hold the automobile being towed against possible injury incident to the travel of the wrecking car.

Another object of the invention is to provide a protector bar which is universal in its nature so as to permit the automobile being towed to readily track behind the wrecking car and to give relative to the wrecking car during the travel of the wrecking car and vehicle being towed over a rough roadway.

A further object of the invention is the provision of a universal protector bar associated with a wrecking car below the lifting crane and movable relative to the crane both in a horizontal and vertical plane, the outer end of the bar terminating in rear of the rear end of the crane for insuring the proper spacing of the disabled automobile from the crane to prevent injury to the disabled vehicle such as the breaking of the windshield and the like, the crane carrying a swivel hoisting hook for engaging the grappling chains of the disabled car movable in a vertical plane toward and away from the wrecking car whereby movement of the disabled automobile is allowed incident to the starting and stopping of the wrecking car.

A still further object of the invention is to provide an improved device of the above character, which will be durable and efficient in use, one that will be simple and easy to manufacture and one which can be incorporated with a wrecking car at a small cost.

With these and other objects in view, the invention consists in the novel construction, arrangement and formation of parts, as will be hereinafter more specifically described, claimed, and illustrated in the accompanying drawings, in which drawings:

Figure 1 is a side elevation of the improved universal protecting bar showing the same incorporated with the rear end of a wrecking car.

Figure 2 is a horizontal section taken on the line 2—2 of Figure 1 looking in the direction of the arrows and illustrating the universal bar in plan.

Figure 3 is a fragmentary top plan view of the rear end of the lifting crane illustrating the means of associating one of the hoisting pulleys therewith.

Referring to the drawings in detail, wherein similar reference characters designate corresponding parts throughout the several views the letter A generally indicates a crane of a wrecking car B which can be of the standard or conventional construction and C the novel universal protector bar C therefor.

As stated the crane is of the usual construction and embodies the rearwardly extending arcuate arms 5 which gradually converge toward one another at their rear ends. As shown the rear terminal of the arcuate supporting arms 5 are connected by a bridge piece 6 which supports the shaft or bolt 7 for the hoisting pulley 8. By this construction the pulley 8 is permitted to swing in an arc transversely of the crane. The arcuate arms 5 can be braced by supporting standards 9 of any desired construction and which can be secured to the chassis of the wrecking car in any desired way.

The improved universal protector bar C embodies a swinging yoke 10 which is arranged transversely of the frame and this yoke can either be connected with any preferred part of the chassis of the vehicle or directly with the crane. As shown the supporting standards 9 are provided with transversely alined bearings 11 for the reception of a transverse shaft 12 on which is journaled the terminals of the yoke 10. By this construction it can be seen that the yoke is permitted to swing in a vertical plane. The central portion of the swinging yoke 10 is bent at right angles as at 13 to lie in a horizontal plane and the inner end of the bar C is twisted in a like manner and pivotally connected thereto by means of a vertical shaft or pivot pin 14. By this arrangement it can be seen that the bar is permitted to swing in a horizontal plane. This bar C can be constructed in any preferred way such as from a casting or the like, but as shown the same is formed from a pair of abutting straps 15 which can be riveted or otherwise secured together. The outer ends of these straps 15 are bowed in opposite directions to provide a yoke 16 in which is fitted a guide pulley 17. This pulley 17 is mounted for rotation on a transverse shaft 18 which also supports the depending U-shaped clevis 19 for rocking movement. This clevis 19 is permitted to swing toward and away from the wrecking car. The lower end of the clevis has swiveled thereto the hoisting hook 20 which is adapted to engage the usual grappling chains connected with the disabled vehicle.

The hoisting cable 21 of the crane A has one end secured to the crane adjacent to the hoisting pulley 8 while its opposite end is trained about the hoisting drum (not shown) in the usual manner. The intermediate portion of the cable is trained about the pulleys 8 and 17 in a manner clearly shown in Figure 1 of the drawings.

The novel universal protector bar C is permanently connected with the crane or wrecking car so that the hook 20 carried thereby can be at once connected with the usual eye of the grappling chains commonly used for the car, which is to be towed, thereby eliminating the use of extraneous bars and the like and the difficulty contingent with the placing of such extraneous bars and the like in place.

In use of the improved device the hook 20 is connected with the disabled vehicle in the conventional manner and owing to the length of the bar C, the rear end of which projects an appreciable distance beyond the rear end of the frame, the disabled vehicle will be held spaced from the frame whereby breakage of the windows or top of the car is prevented.

Owing to the universal character of the bar C the disabled vehicle is permitted to readily track behind the wrecking car and move relative to the wrecking car incident to the travel of the wrecking car and disabled vehicle over a rough roadway.

Changes in details may be made without departing from the spirit or scope of the invention, but—

What I claim as new is:

The combination with a vertical bracket, of a pair of bearings carried thereby, a shaft revoluble in the bearings, a U-shaped member having its ends fixed to the shaft and provided with a flattened portion intermediate its ends, an arm pivoted to the flattened portion to swing about a horizontal axis, a pulley journaled in the outer end of the arm, a hook depending from the outer end of the arm, and disposed below the pulley and flexible means engaged with the pulley whereby to raise or lower the arm.

In testimony whereof I affix my signature.

CLAUDE E. CHILSON.